United States Patent
Schucker

(10) Patent No.: US 6,273,937 B1
(45) Date of Patent: Aug. 14, 2001

(54) MEMBRANE PERVAPORATION AND VAPOR PERMEATION SYSTEM

(75) Inventor: Robert C. Schucker, The Woodlands, TX (US)

(73) Assignee: Trans Ionics Corporation, The Woodlands, TX (US)

( * ) Notice: Subject to any disclaimer, the term of this patent is extended or adjusted under 35 U.S.C. 154(b) by 0 days.

(21) Appl. No.: 09/537,834

(22) Filed: Mar. 29, 2000

(51) Int. Cl.⁷ ................................................ B01D 53/22
(52) U.S. Cl. .................................. 95/45; 95/50; 210/640
(58) Field of Search ........................ 95/45–56; 210/640

(56) References Cited

U.S. PATENT DOCUMENTS

| | | | |
|---|---|---|---|
| 2,970,106 | 1/1961 | Binning et al. | 208/347 |
| 4,108,765 * | 8/1978 | Lee | 210/640 |
| 4,218,312 * | 8/1980 | Perry | 210/640 |
| 4,430,807 * | 2/1984 | Davis et al. | 210/640 X |
| 4,670,151 * | 6/1987 | Bitter | 210/641 |
| 4,929,357 * | 5/1990 | Schucker | 210/640 |
| 4,929,358 * | 5/1990 | Koenitzer | 210/640 |
| 4,952,751 * | 8/1990 | Blume et al. | 210/640 X |
| 5,030,356 * | 7/1991 | Blume et al. | 210/640 |
| 5,039,417 * | 8/1991 | Schucker | 210/640 |
| 5,169,533 * | 12/1992 | Baker et al. | 210/640 |
| 5,226,932 * | 7/1993 | Prasad | 95/45 |
| 5,290,452 * | 3/1994 | Schucker | 210/640 |
| 5,753,008 | 5/1998 | Friesen et al. | 95/45 |

OTHER PUBLICATIONS

Mitchell, J.V.; "J. Roy. Inst. 2", (1010), 1831, 307.
Binning, R.C.; R.J. Lee; J. F. Jennings and E. C. Martin; "Ind. and Eng. Chem.", 53(1), 1961, 45–50.

* cited by examiner

Primary Examiner—Robert H. Spitzer
(74) Attorney, Agent, or Firm—Henry E. Naylor

(57) ABSTRACT

An improved membrane pervaporation and vapor permeation system is disclosed in which the vacuum is produced by a fluid passing through a Venturi-type nozzle. The fluid is chosen from solvents that have an affinity for the permeate molecules. It is applicable over of process feed rates, can be used with either organic or aqueous systems and conserves energy relative to existing technology.

18 Claims, 3 Drawing Sheets

MEMBRANE PERVAPORATION AND VAPOR PERMEATION SYSTEM

FIELD OF THE INVENTION

The present invention relates to a method for the separation of a multicomponent feed stream into a permeate stream rich in one or more components of the feed stream and a retentate stream lean in those same components.

BACKGROUND OF THE INVENTION

Pervaporation is a commercially-practiced membrane separation process in which a non-porous membrane is contacted with a multicomponent liquid feed, resulting in the selective absorption of one or more of the species from the feed. These sorbed species permeate across the membrane under the influence of a concentration gradient that is produced by evaporating the sorbed molecules from the product side of the membrane using a vacuum or sweep gas. Permeate vapor is then condensed and recovered as a liquid. Vapor permeation differs from pervaporation in that the feed is already in the vapor phase.

The concept of pervaporation has been recognized for a long time (Mitchell, J. V.; *J. Roy. Inst.*, 2 (101), 1831, 307); however, only in the past 40 years has development of this technology as a process taken place. Binning and coworkers at American Oil Co. (Binning, R. C.; R. J. Lee; J. F. Jennings and E. C. Martin; *Ind. and Eng. Chem.*, 53(1), 1961, 45–50; Binning, R. C et al., U.S. Pat. No. 2,970,106, January 1961) were the first to suggest, based on their experiments with organic liquid mixtures, that pervaporation had commercial potential. During the next two decades, however, most of the work on pervaporation focused on alcohol (ethanol)-water separation, since this demonstrated that pervaporation could achieve something not possible by ordinary distillation-breaking of the ethanol-water azeotrope. SETEC and GFT (now part of Le Carbone-Lorraine) in Germany commercialized pervaporation membrane systems based on composite polyvinyl alcohol membranes for this application in the 1980's as reported by Bruschke and coworkers (Bruschke, H. E. A.; G. F. Tusel and R. Rautenbach; *ACS Symposium Series*, 281, 1985, 467–478); and there are numerous commercial facilities around the world with capacities as large as 150,000 liters/day using this technology. The current invention relates to an improvement in both pervaporation systems and vapor permeation systems and specifically an improved method of maintaining a low partial pressure of permeate on the permeate side of the membrane. U.S. Pat. NO. 5,753,008, which is incorporated herein by reference, which discloses a vapor permeation process, teaches that there are three known ways used for maintaining a sufficiently low partial pressure of permeate on the downstream side of a membrane: (a) the vacuum method, (b) the dilution method and (c) the countercurrent sweep method. Most commercial pervaporation systems use the vacuum method. Small systems use vacuum pumps while larger systems, of necessity, use multi-stage steam ejectors; and the cost of operation with the latter becomes a significant part of the total package cost.

There are problems with both methods of maintaining vacuums. Vacuum pumps achieve excellent vacuums (<10 torr), but are expensive to maintain. Unfortunately, the better the vacuum, the harder it is to condense the permeate; and many commercial pervaporation systems have expensive refrigeration systems as part of their condensers. Furthermore, because it is impossible even at very low temperatures to totally condense the permeate (especially at <10 torr), vacuum pump oil may become contaminated with permeate, thus requiring more maintenance. Vacuum pumps cannot be used for large systems, because their displacements are generally too low.

Steam ejectors are simpler, but are limited in the level of vacuum they can achieve at reasonable steam flow rates. Three-stage ejectors are normally required for pervaporation systems, thus adding to their complexity. Furthermore, a small amount of permeate is mixed with the steam condensate; and, while for most organic systems, the water phase and the organic phase separate, there is always a finite concentration of permeate dissolved in the water condensate that still needs to be removed prior to discharge into natural waterways.

It would be desirable to have an inexpensive process for the selective pervaporative separation of either aqueous or organic feeds that is applicable over a wide range of feed rates. Such a process would represent a significant advance in the art.

It is therefore an object of the present invention to provide a highly efficient method and apparatus for pervaporation or vapor permeation that can be used in both small and large process applications.

It is a further object of the present invention to provide a highly efficient method and apparatus for treatment of either aqueous or organic feeds. It is still a further object of the present invention to provide a highly efficient method and apparatus that provides superior performance using different module designs (hollow fiber, spiral wound or stacked flat).

These and other objects, which will become apparent to one of ordinary skill, are summarized and described in detail below.

SUMMARY OF THE INVENTION

In accordance with the present invention there is provided a process for the separation of multicomponent feed streams into a permeate stream rich in one or more components of the feed and a retentate stream lean in those same components comprising: a) passing said feed stream to a permeation unit containing a membrane having a first surface and a second opposing surface; b) contacting said first surface with said feed stream wherein one or more components of said multicomponent feed stream selectively dissolves into said membrane at said first surface and permeates through said membrane from said first surface to said opposing second surface under the influence of a concentration gradient across said membrane, said concentration gradient being maintained by the use of a vacuum on said second opposing surface, which vacuum is produced by a fluid passing through a Venturi-type nozzle, said permeate being drawn from said second opposing surface into said Venturi-type nozzle and into a working fluid passing through said nozzle; c) separating said permeate from said working fluid.

In preferred embodiments of the present invention the feedstream is selected from those comprising liquids, vapors and permanent gases, such as inert gases.

In another preferred embodiment of the present invention the feedstream comprises a naphtha stream, more preferably a gasoline stream.

In yet another preferred embodiment of the present invention the feedstream comprises a mixed olefin/paraffin stream.

In still another preferred embodiment of the present invention the relative volatility of said permeate versus said working fluid is at least about 1.05, preferably at least about 1.2.

In other preferred embodiments of the present invention the working fluid is comprised of one or more solvents that have an affinity for the permeate molecules, preferably from those selected from the group consisting of propylene carbonate, ethylene carbonate, N-methyl pyrrolidone, tetramethylene sulfone, tetraethylene glycol, N-formyl morpholine, furfural, nitrobenzene, dipropylene glycol, glycerol, diethylene glycol, ethylene glycol and n-butylmethyl immidazolium hexafluorophosphate.

In yet other preferred embodiments of the present invention the fluid leaving said Venturi-type nozzle is at a temperature range of about 0° C. to 150° C.

DETAILED DESCRIPTION OF THE INVENTION

Figure 1:
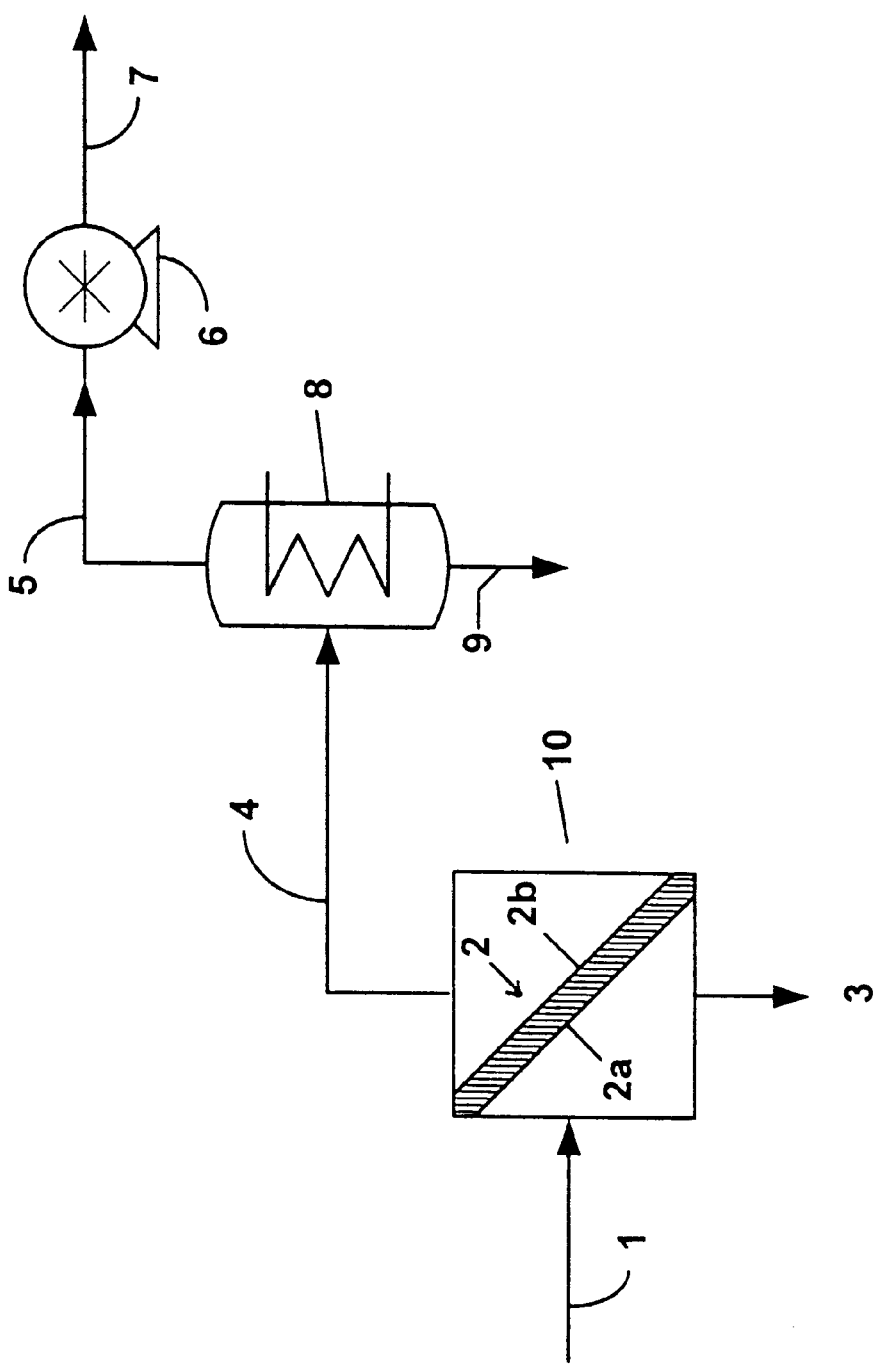
FIG. 1 is a process flow sheet for a conventional pervaporation system utilizing a vacuum pump to pull vacuum on the membrane permeate side.

The present invention relates to a method for the separation of a multicomponent feed stream into a distinct permeate stream rich in one or more components of the feed stream and a distinct retentate stream lean in those same components. More particularly, the present invention is directed to an improved method of achieving the vacuum required on the permeate side of the membrane using an aspirator rather than a vacuum pump. The invention is best understood when compared to the two conventional configurations of vacuum systems used in pervaporation: (a) vacuum pumps and (b) steam ejectors. Referring to FIG. 1, the feed is pumped into the permeation unit 10 through line 1. The permeation unit contains a non-porous membrane 2 having a first surface 2a and an opposing second surface 2b. A portion of the feed dissolves into and permeates across the selective membrane 2 from the first surface 2a to the opposing second surface 2b. The permeate is volatilized from the second surface 2b by the vacuum being pulled by vacuum pump 6 and exits the permeation unit through line 4. Permeate vapor then passes into condenser 8, where cooling coils or some other suitable effective heat transfer surface lowers the temperature of the vapor to the point that it condenses at the vacuum in the system. Liquid permeate exits the condenser through line 9. Air or other gases that have leaked into the system are removed through line 5 by vacuum pump 6 and exit the system through line 7.

Figure 2:
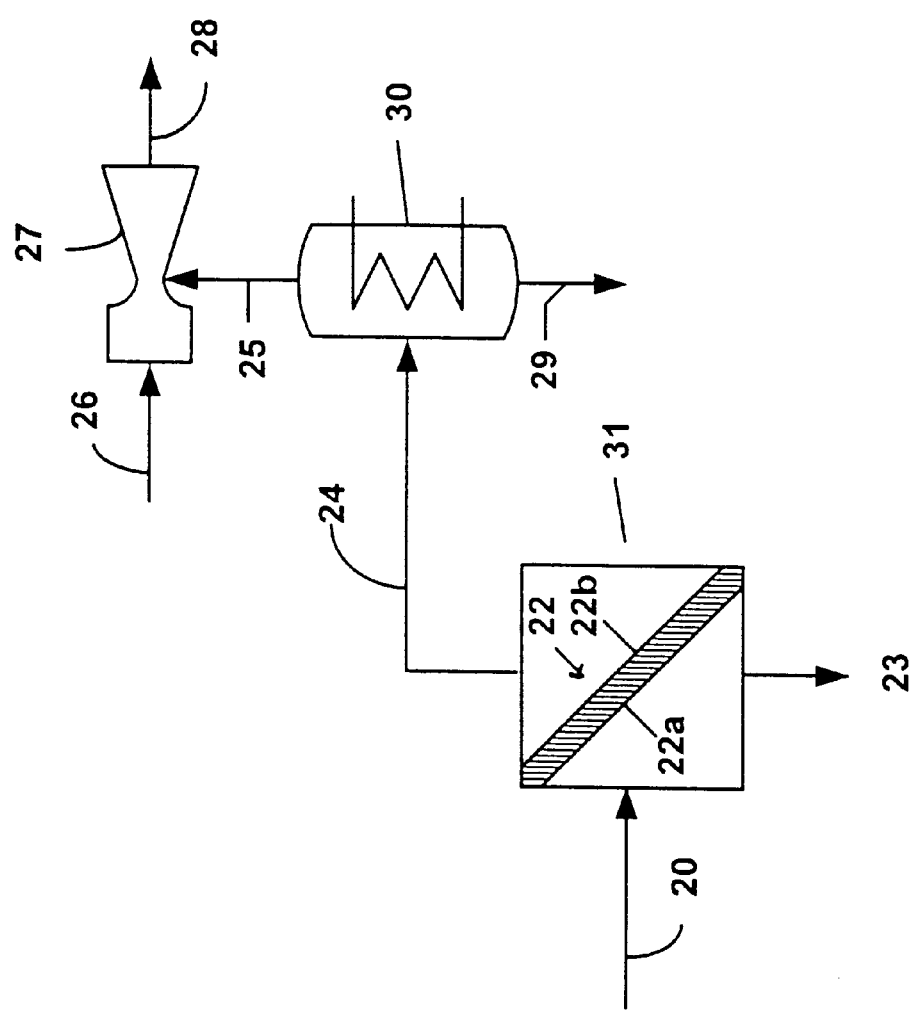
FIG. 2 is a process flow sheet for a conventional pervaporation system utilizing a steam ejector to pull vacuum on the membrane permeate side.

Referring to FIG. 2, the feed is pumped into the permeation unit 31 through line 20. The permeation unit contains a non-porous membrane 22 having a first surface 22a and an opposing second surface 22b. A portion of the feed dissolves into and permeates across the selective membrane 22 from the first surface 22a to the opposing second surface 22b. The permeate is volatilized from the second surface 22b by the vacuum being pulled by steam ejector 27 and exits the permeation unit through line 24. Permeate vapor then passes into condenser 30 where cooling coils or some other suitable effective heat transfer surface lower the temperature of the vapor to the point that it condenses at the vacuum in the system. Liquid permeate exits the condenser through line 29. Air or other gases that have leaked into the system are removed through line 25 by steam ejector 27 and exit through line 28. Vacuum is pulled by steam passing into the ejector through line 26 and exiting also through line 28.

Figure 3:
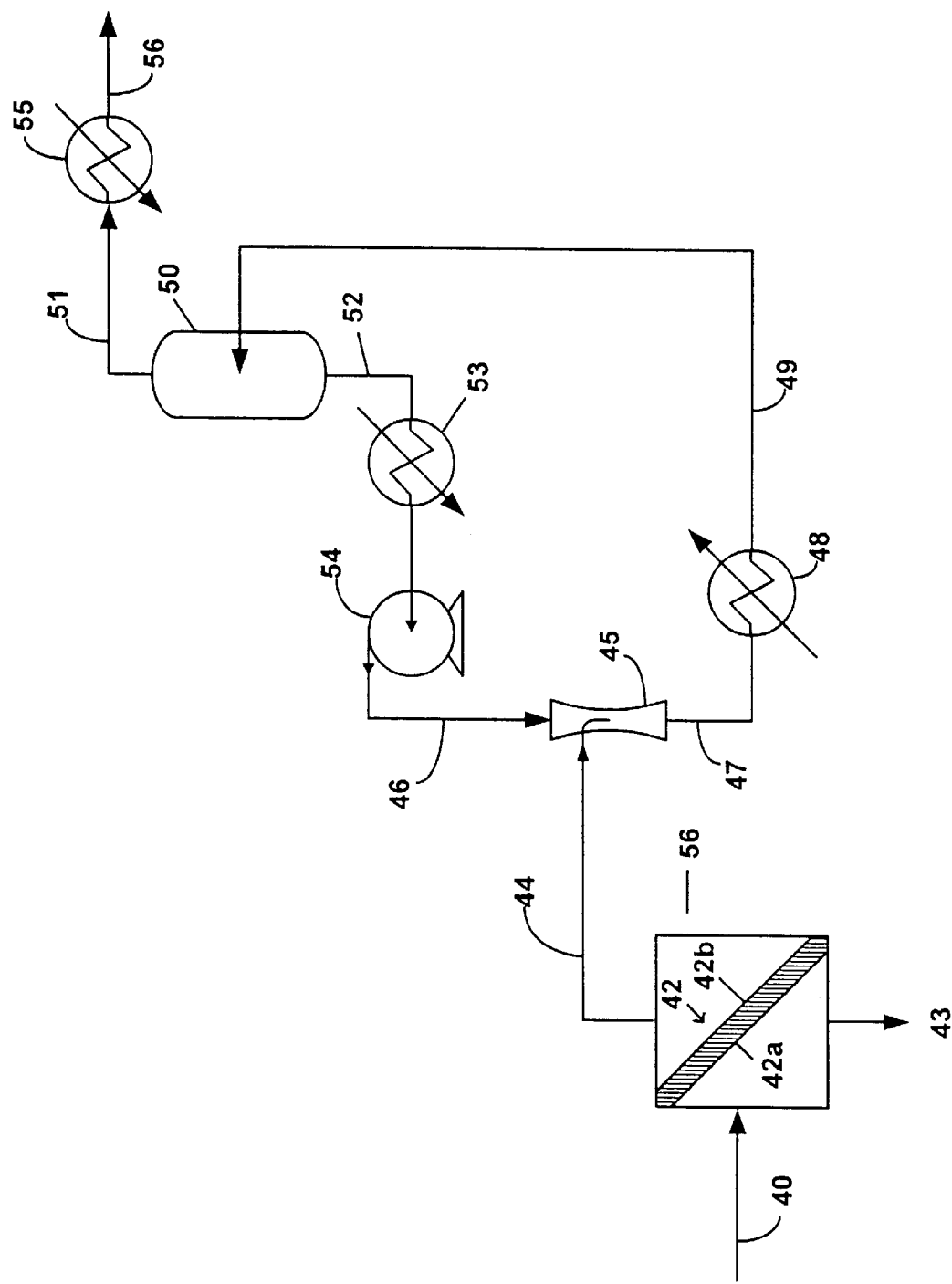
FIG. 3 is a process flow sheet for the present invention.

The configuration of the present invention is shown in FIG. 3. The feed is pumped into the permeation unit 56 through line 40. The permeation unit contains a non-porous membrane 42 having a first surface 42a and an opposing second surface 42b. A portion of the feed dissolves into and permeates across the selective membrane 42 from the first surface 42a to the opposing second surface 42b. The permeate is volatilized from the second surface 42b by the vacuum being pulled by the Venturi-type nozzle 45 and exits the permeation unit through line 44. Venturitype nozzles are well known in the art and thus a detailed description is not needed for purposes of this invention. A typical Venturi-type nozzle will be a circular-arcVenturi having a converging-diverging pathway. The converging-diverging pathway causes an increase in the velocity of flow of a fluid and a corresponding decrease in fluid pressure, thus creating a suction, or vacuum, for drawing a fluid therethrough. It is preferred that the temperature of fluid leaving the Venturi-type nozzle is from about 0° to about 150° C. Working fluid is pumped by pump 54 through line 46 into the Venturi-type nozzle. The passage of liquid through the converging-diverging nozzle creates a suction on the permeate module. Working fluid containing permeate which has dissolved into it exits through line 47. It is then heated by heat exchanger 48 and passes through line 49 to the flash drum or tower 50, where the permeate flashes off and exits through line 51. It is then cooled and condensed by heat exchanger 55, which operates at approximately atmospheric pressure, and exits as a liquid through line 56. Note that it is easier to condense this vapor because the pressure is higher than in high vacuum systems. Non-volatile working fluid exits the flash tower through line 52, is cooled by heat exchanger 53 and enters the suction side of pump 54 for recycle to the Venturi-type nozzle.

The retentate exits the bottom of the permeation unit in all three Figures hereof and is shown as 3 in FIG. 1, as 23 in FIG. 2, and as 43 in FIG. 3.

The present invention provides a method of providing a vacuum for a pervaporation or vapor permeation system that does not use a vacuum pump or a steam ejector. It is based on the use of a converging-diverging (Venturi-type) nozzle that uses a liquid extraction solvent as the working fluid instead of steam. The permeate side of the membrane module is connected directly to the throat of the Venturi, so that the working fluid passing through the nozzle pulls a vacuum on the membrane system. The extraction solvent is preferably one that has an affinity for the permeate molecule, thereby significantly lowering the permeate vapor pressure even more.

The present invention can be used for both vapor permeation and pervaporation. It can be used in any number of separations, including but not limited to, (a) organic liquid separations (such as aromatic/aliphatic separation, which may include separation of aromatics from cat naphtha having a nominal boiling range of 75° F. to 430° F., such as the separation of benzene from cat naphtha or gasoline and the separation of aromatics from lube oil streams; olefin/paraffin separation, such as ethylene from ethane and propylene from propane; and methyl tertiary butyl ether (MTBE)/methanol separation), (b) recovery of volatile organic compounds from wastewater, such as MTBE from water; (c) recovery of solvents from purge gas streams, which gas streams are preferably normally gaseous streams or permanent gas streams such as nitrogen, argon and the like, which can also include the recovery of trichloroethylene and other dry cleaning solvents from air; (d) alcohol/water separations, such as the removal of ethanol from water, including beverages; and (e) the dehydration of organic streams. Preferred working fluids for use in the instant invention will have at least one, more preferably at least two of the following characteristics: a) an effective boiling point different from the permeate; b) an affinity for the permeate molecules and c) thermal stability at process temperatures. The term "effective boiling point different from the permeate", as used herein, means the difference between the boiling point of the working fluid and permeate will be sufficient to allow an effective separation of the two in a separation stage, such as in a flash drum. It is preferred that the boiling point difference be measured in terms of the relative volatility of the two fluids. For example, it is preferred that the relative volatility of the permeate versus the working fluid be at least about 1.05, more preferably at least 1.2 and most preferably at least 1.4. Working fluids for aromatic/aliphatic separations include, but are not limited to, those selected from the group consisting of propylene carbonate, ethylene carbonate, N-methyl pyrrolidone, tetramethylene sulfone, tetraethylene glycol, N-formyl morpholine, furfural, nitrobenzene, dipropylene glycol, glycerol, diethylene glycol, ethylene glycol and nbutyl-methyl immidazolium hexafluorophosphate, and mixtures thereof. Working fluids for recovery of VOCs from wastewater and recovery of solvents from gas streams include many of these same solvents and additionally include silicone fluids and low temperature ionic liquids. For alcohol/water separations and dehydration of organic streams, glycol-based solvents (tetraethylene glycol, propylene glycol and glycerine) are preferred.

Persons of ordinary skill in the art will recognize that many modifications in this process are possible, including but not limited to (a) integration of the heat exchangers for optimum heat utilization, (b) utilization of working fluids that are totally immiscible with the permeate thus replacing the flash tower with a simple decanter, (c) use of reactive species in the working fluid to chemically react with or complex the permeate in such a way that its vapor pressure is even lower, and others. The embodiment described herein is meant to be illustrative only and should not be taken as limiting the invention, which is defined in the following claims.

What is claimed is:

1. A process for the separation of a multicomponent feed stream into a permeate stream rich in one or more components of the feed stream and a retentate stream lean in those same components comprising: a) passing said feed stream to a permeation unit containing a membrane having a first surface and a second opposing surface: b) contacting said first surface with said feed stream wherein one or more components of said feed stream selectively absorb into said first surface and permeate through said membrane from said first surface to said opposing second surface under the influence of a concentration gradient across said membrane, said concentration gradient being maintained by the use of a vacuum on said second surface, which vacuum is produced by a working fluid passing through a venturi nozzle which working fluid is comprised of one or more solvents that have an affinity for permeate molecules, said permeate being drawn from said second surface into said venturi nozzle and into said working fluid passing through said nozzle; and c) separating said permeate from said working fluid.

2. The process of claim 1 wherein the feedstream comprises a liquid.

3. The process of claim 2 wherein the feedstream comprises a naphtha stream which has a nominal boiling range of 75° F. to 430° F.

4. The process of claim 2 wherein the feedstream comprises a mixed gasoline stream.

5. The process of claim 2 wherein the feedstream comprises a mixed olefin/paraffin stream.

6. The process of claim 2 wherein the feedstream comprises an aqueous stream containing dissolved organics.

7. The process of claim 2 wherein the feedstream comprises an organic stream containing dissolved water.

8. The process of claim 2 wherein the feedstream comprises an organic stream containing dissolved and free water.

9. The process of claim 1 wherein the feedstream comprises a vapor.

10. The process of claim 9 wherein the feed comprises a vaporized organic stream.

11. The process of claim 9 wherein the feed comprises a natural gas stream.

12. The process of claim 1 wherein the feedstream comprises one or more permanent gases.

13. The process of claim 12 wherein the feedstream comprises nitrogen containing an organic component.

14. The process of claim 12 wherein the feedstream comprises argon containing an organic component.

15. The process of claim 12 wherein the feedstream comprises air containing an organic component.

16. The process of claim 12 wherein the feedstream comprises carbon dioxide containing an organic component.

17. The process of claim 1 wherein said working fluid is selected from the group consisting of propylene carbonate, ethylene carbonate, N-methyl pyrrolidone, tetramethylene sulfone, tetraethylene glycol, N-formyl morpholine, furfural, nitrobenzene, dipropylene glycol, glycerol, diethylene glycol, ethylene glycol and n-butyl-methyl immidazolium hexafluorophosphate.

18. The process of claim 1 wherein the fluid leaving said venturi nozzle is at a temperature range of about 0° C. to 150° C.

* * * * *